United States Patent

Gehlert et al.

[11] Patent Number: 5,829,632
[45] Date of Patent: Nov. 3, 1998

[54] FLEXIBLE BAND PHARMACEUTICAL PRODUCT FEEDER GATE ASSEMBLY

[75] Inventors: Klaus E. Gehlert, Warminster; John W. Waitz, Bensalem, both of Pa.

[73] Assignee: Gemel Precision Tool Co., Inc., Ivyland, Pa.

[21] Appl. No.: 797,194

[22] Filed: Feb. 11, 1997

[51] Int. Cl.⁶ .................. B65G 59/06; B65H 3/44
[52] U.S. Cl. .................. 221/268; 221/264; 221/93; 221/95
[58] Field of Search .................. 221/93, 95, 264, 221/268

[56] References Cited

U.S. PATENT DOCUMENTS

| | | | |
|---|---|---|---|
| 1,383,623 | 7/1921 | Groves | 221/93 |
| 2,385,311 | 9/1945 | Strauss | 221/93 |
| 2,683,554 | 7/1954 | Mulhauser, Jr. | 221/264 |
| 3,014,617 | 12/1961 | Kireta | 221/268 |
| 4,653,668 | 3/1987 | Gibilisco et al. | 221/263 |
| 4,922,682 | 5/1990 | Tait et al. | 53/900 |
| 5,415,321 | 5/1995 | Gehlert et al. | 221/264 |

*Primary Examiner*—H. Grant Skaggs
*Assistant Examiner*—Patrick Mackey
*Attorney, Agent, or Firm*—John J. Simkanich

[57] ABSTRACT

A gate assembly, for a dedicated feeder sub-system in a pharmaceutical product packaging system, includes a flexible gating structure. Product feed tubes leading from a product bin to a packaging web loading station carry slots in which flexible bands operate to intercept product within the product feed tubes. A drive mechanism controls the position of the flexible bands to intercept the line of flow product units and to index a single product unit at a time from each feed tube. The indexing of individual product from each feed tube is simultaneous thereby loading a matrix of product onto the packaging web in a single load operation. The operation of the drive is timed in synchronism with the operation of the packaging system. Change over adjustments are available for different product shapes, sizes and characteristics.

20 Claims, 6 Drawing Sheets

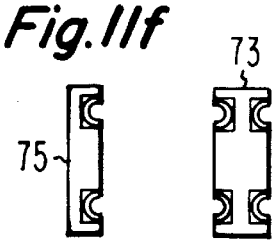
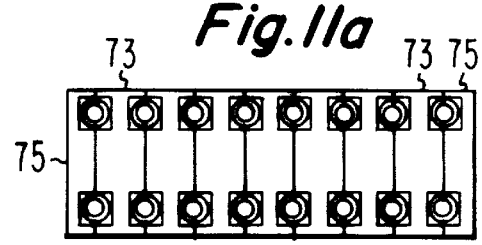
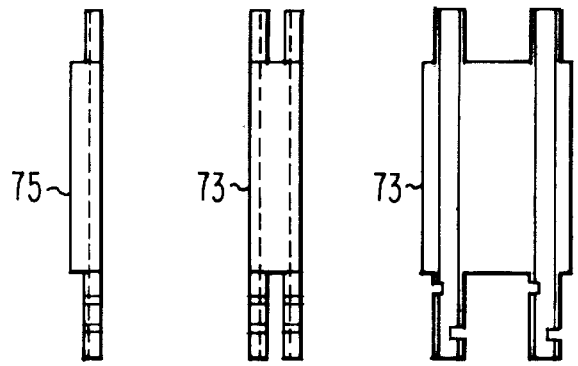
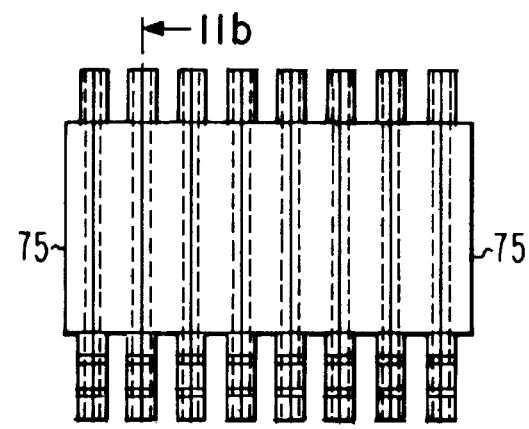
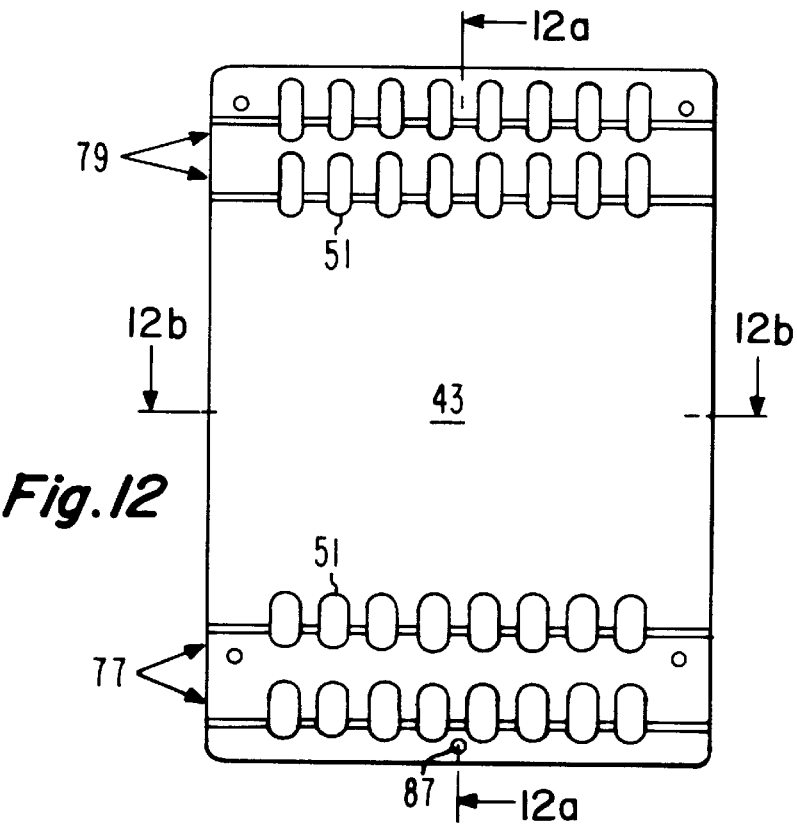
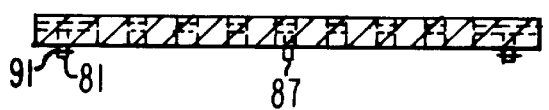

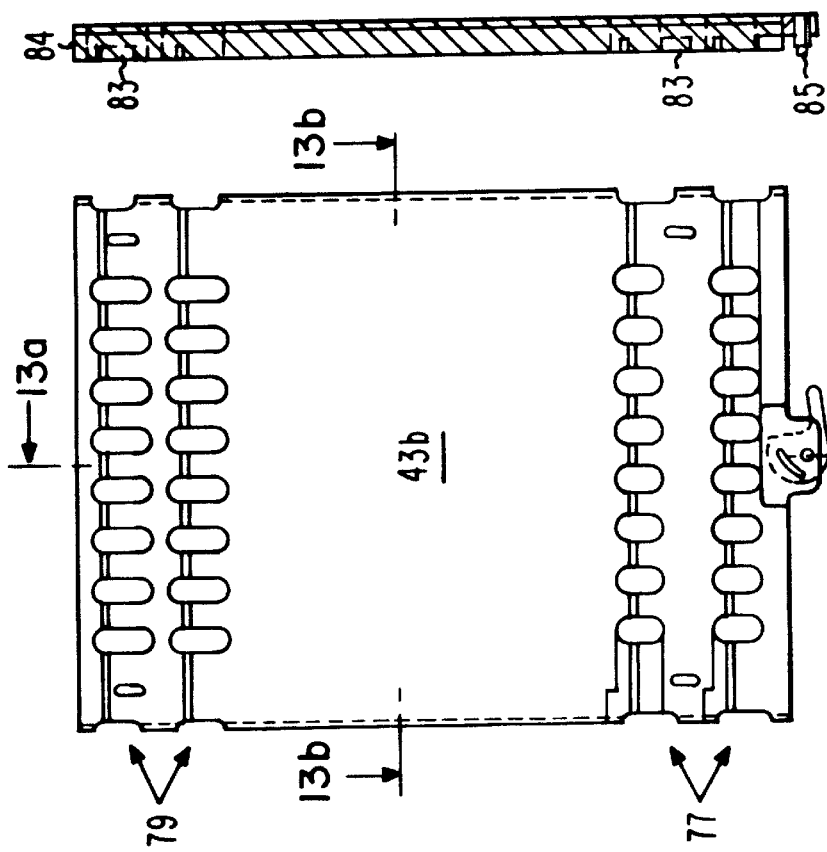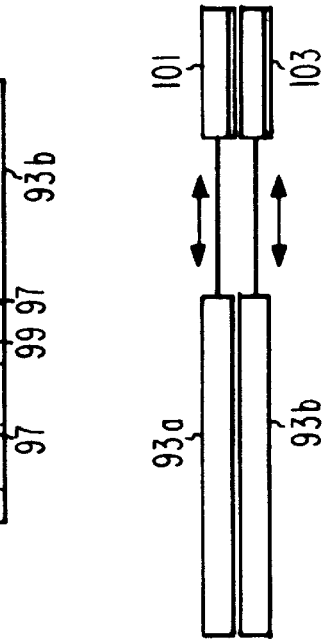

FLEXIBLE BAND PHARMACEUTICAL PRODUCT FEEDER GATE ASSEMBLY

BACKGROUND OF THE INVENTION

The present invention relates to a feeder subsystem which operates at a feeder station for delivering a matrix of pharmaceutical product to a blister package receiving web. This feeder is part of a packaging system. The pharmaceutical product may include tablets, capsules, caplets, liquid gel caps and the like. The invention further relates to such a feeder which simultaneously delivers a gated quantity of said product in a two-dimensional matrix format, at the blister package web feeding (loading) station. Moreover, the invention relates to an improved gating apparatus assembly which reduces or eliminates product shearing, and which facilitates the clearing of any product hang-ups.

Pharmaceutical product feeders generally feed product from a bin or container into a discharge mechanism which moves the product to a distributor structure. This distributor structure may generally comprise a plurality of individual feed tubes (feed passageways or chutes) correspondingly positioned in alignment with respective receiving pockets in the packaging web portion to be filled with the pharmaceutical product. Each feed tube carries serially positioned product.

The matrix of product (simultaneous fed from each tube) is sequentially fed onto the packaging web's receiving pocket matrix portion, as each sequential portion arrives at the feeder station. The gating apparatus must control the sequential depositing of product from each product tube, in the proper timed sequence.

Higher volume packaging systems require higher volume feeders. This higher volume requires faster gating of product. Product gating becomes a simultaneous duplication for each product feed tube, of the product indexing for an individual feed tube.

The movement of product down (along) a feed tube may be affected, often randomly, by changes in ambient conditions, by product shape and weight, by variations in individual product surface, by individual product orientation with respect to the feed tube and by individual product orientation with respect to adjacent product. These factors can create product hang-ups, or product chipping or shearing at the gate structure, especially in higher speed operations.

Prior gating assembly structures have often utilized one of two design approaches. Either they have used straight-through feed tubes, with rigid product intercepting fingers or plates, or they have utilized index shifting with off-set feed tubes. Regardless of the type of gating structure, gating must include a two step gating operation.

The first step is the holding, i.e., interception of the entire stack of product sequentially oriented in a feed tube, except for the individual product at the end of the feed tube. The second step is the release or feeding of the individual product at the end of the feed tube. Heretofore, these two steps have been performed by rigid structures in reciprocating operation to transversely intercept the product flow path.

In the straight-through flow feeder structure, a pair of rigid fingers or plates have alternatingly intercepted the product flow path at a spacing of one product size. In the off-set flow feeder structure a shuttle plate indexes and shifts (physically moves) individual product. Each of these structures have incorporated a discharge chute down stream from the gating operation location. This discharge chute, regardless of length, is used to direct the product exiting the gating operation and onto the web.

Pneumatic and electric motor drives have been incorporated into such feeders to operate the gate fingers or plates or shuttles.

Generally, these feeder gate structures have incurred several shortcomings. These shortcomings have included: a lack of ease of disassembly for cleaning or jam clearing; product hang-ups which are sensitive to speed of operation; and product chipping and shearing by the gating structure itself.

What is desired is a feeder gate assembly structure wherein product hang-ups are less likely to occur.

What is also desired is a feeder gate assembly in which gate created product chipping and shearing is greatly reduced or eliminated.

What is further desired is a feeder gate assembly which passes broken product and is jam self-clearing.

What is also desired is a feeder gate assembly which is easily disassembled for cleaning and is easily capable of changeover for different product handling.

SUMMARY OF THE INVENTION

The present invention is realized in a flexible band feeder gate assembly which operates to simultaneously deliver a plurality of pharmaceutical product, in a two-dimensional matrix format, from a matrix of feed tubes (delivery passageways) to a blister package webbing loading station. Each feed tube holds a sequential line of individual product units, which are to be individually fed therefrom, in timed sequence to the blister web loading operation.

A plurality of flexible bands are employed which move transversely to the flow path of product to intercept product. The line of product in each feed tube is held back, by a first flexible band while the individual product unit proximate the discharge end of the feed tube is freed for discharge onto the blister package web, by the release operation of a second flexible band.

The path of product in each feed tube is alternately intercepted by a first (upper) and second (lower) flexible band. The transverse movement of each flexible band into the feed tube is guided by a respective co-acting transverse slot in the feed tube. The size of the slot affects the cross-section size of each flexible band. The depth of the slot affects the travel and ultimate depth of transverse movement of each flexible band. The strength and tension on each band affects the amount of give it can have when encountering irregularities.

The bands are transversely moved and carried into position across the line of product flow in each feed tube by the operation of a carrier plate which moves, in reciprocating shuttle fashion, transversely to the line of flow of the feed tubes. The speed, travel and sequence of operation of the carrier plate is determined by the drive to which it is attached and by packaging system control signals sent to this drive.

This flexible band feeder gate assembly yields a structrue where product hang-up are less likely to occur. Moreover, product chipping and shearing by the gating operation is reduced or eliminated. Broken or disfigured product is permitted to pass the gating and jams are self-clearing.

DESCRIPTION OF THE DRAWINGS

The features, advantages and operation of the present invention will be better understood from a reading of the following detailed description of the invention, in conjunction with the following drawings, in which like numerals refer to like elements and in which:

FIG. 11 is a side view of the assembly of plates forming the product feed tubes for the flexible gate assembly invention, which feed tubes carry the slots in which the flexible bands operate;

FIG. 11a is a top plan view of the assembly of the product feed tubes of FIG. 11;

FIG. 11b is a side view showing the half cylinder cavity of a single product feed tube plate forming the assembly of FIG. 11;

FIG. 11c is a side view of an inner plate of the assembly of FIG. 11 viewed as shown in FIG. 11;

FIG. 11d is a side view of the end plate of the assembly of FIG. 11 viewed as shown in FIG. 11;

FIG. 11e is a plan view of the inner plate shown in FIG. 11c;

FIG. 11f is a plan view of the end plate shown in FIG. 11d;

FIG. 12 is a top view of the upper (top) gate plate member which carries the flexible bands which intercept the feed tube product paths gating product thereby;

FIG. 12a is a cross sectional view of the top plate member taken as shown in FIG. 12;

FIG. 12b is a cross sectional view of the top plate member taken transverse to FIG. 12a as shown in FIG. 12;

FIG. 13 is a plan view of the lower (bottom) gate plate member which carries the flexible bands;

FIG. 13a is a cross sectional view of the bottom plate member of FIG. 13 taken as shown in FIG. 13;

FIG. 13b is a cross sectional view of the bottom plate member taken transverse to FIG. 13a as shown in FIG. 13;

FIG. 14 shows the mechanically operated cam which is used to separate the normal position of the top and bottom gate plate members;

FIG. 15 is a cross-sectional view through the paired top and bottom gate plate members with a flexible band orientation at a transverse position to that of FIG. 4; and FIG. 16 shows a two gate plate cylinder assembly for individually driving the gate plate top and bottom plate members.

DETAILED DESCRIPTION OF THE INVENTION

Figure 1:
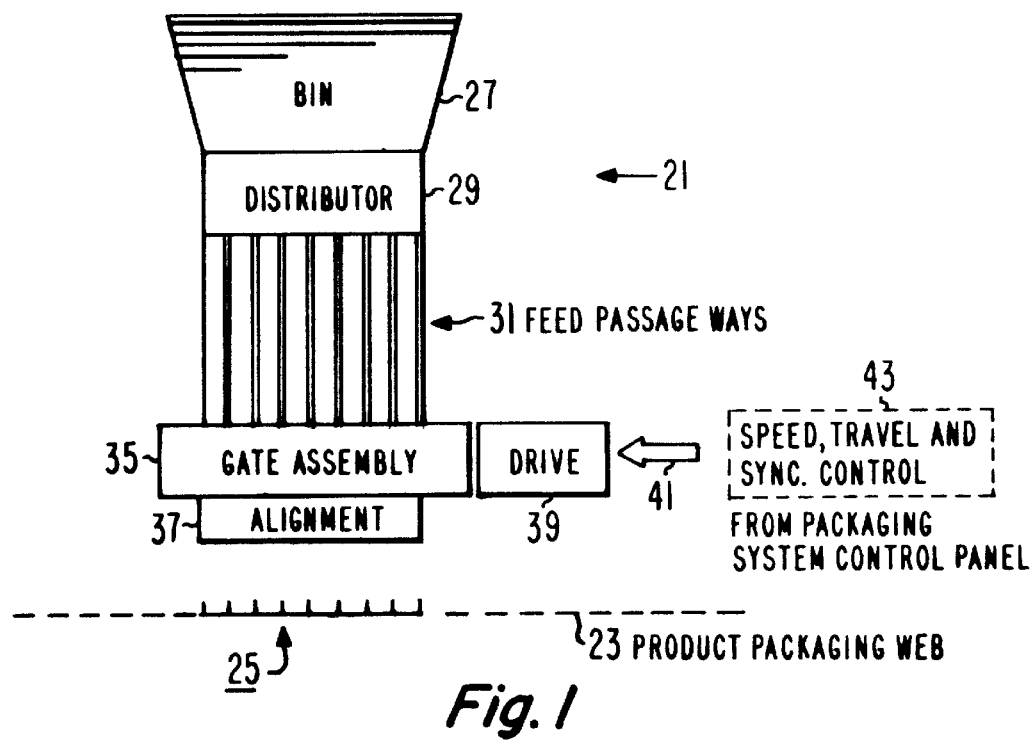
FIG. 1 is a block diagram of a feeder structure of which the flexible gate assembly of the present invention is a portion.

A feeder structure 21 forms a sub-section of a pharmaceutical packaging system. The feeder structure 21 supplies pharmaceutical product to a product packaging web 23 at a loading station 25 shown in block representation in FIG. 1. The pharmaceutical product is fed from a product bin 27, to a distributor structure 29. This distributor 29 transfers product from the bin 27 to each of a plurality of product feed passageways 31. These passageways 31 are arranged in a formation to feed a two dimensional matrix of product units simultaneously onto a product package web portion 33 positioned at the loading station 25. Each of the passageways 31 is as identical to the others as practical. The difference in individual ones of the passageways 31 is its position with respect to the packaging web 23 at the loading station 25. An individual product feed passageway 31 is aligned with an individual web pocket 33 part of the product web positioned below. Product is line-up in each passageway 31 in serial, sequential order.

A product gating assembly 35 interrupts and controls the flow of product through the passageways 31, and the discharge of the product therefrom. This gate assembly 35 has an alignment structure 37 on its discharge side, through which the gated product must pass. The purpose of the alignment structure 37 is to assure that the product path is not altered by the gating operation and that product drops into the web pockets 33 below.

The gate assembly 35 is driven and its operations synchronized by a drive 39. The drive 39 receives speed, travel and synchronization signals 41 from the packaging system control panel 43. An vertical motion can be imparted to the entire feeder structure 21 by the drive 39 whereby the structure 21 is moved upwards away from the web 23 pockets 33 after a matrix load operation and while the web 23 is moved to position the next web portion below the feeder structure 21.

The gate assembly 35 utilizes flexible bands, which will be described below. These flexible bands intersect the path of the product in each of the passageways 31, to interrupt the product flow through the passageways 31, and to index an individual product unit from each passageway 31 simultaneously. These flexible bands function in a alternating, complementary stepped-operation to perform the gating steps of the feeder.

The first step is the holding-back of the flow of the entire line of product in each individual passageway 31, at an upper location, while simultaneously releasing an individual product unit held in position at a lower location below the upper location of each individual passageway 31. The second step is the releasing a single product unit, which is first in line at the upper location of each passageway 31, and then holding it at the second location until it is to be released.

Figure 2:
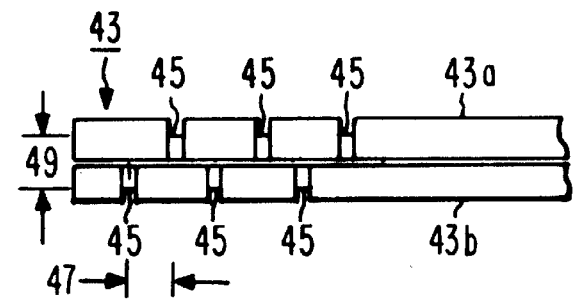
FIG. 2 is a partial side view of a gate carrier plate which holds, spaces, orients and moves the plurality of individual flexible bands operating in the gate assembly.

The flexible bands which perform these process steps are carried on a gate plate 43, FIG. 2, which is part of the gate assembly 35. These bands will be discussed below.

Gate plate 43 is constructed in two pieces, an upper gate plate member 43a and a lower gate plate member 43b. Each gate plate member 43a, 43b has a plurality of parallel grooves 45 extending across its outer face. The positions of the grooves 45 in the upper gate plate member 43a are off-set from the positions in the lower gate plate member 43b, when these upper and lower members 43a, 43b are assembled together. The grooves 45 are paired as upper position and lower position carriers of a respective flexible band. The off-set distance 47 between grooves is a function of the diameter of each passageway 31, which in turn is determined by the size of the product gated.

These groves 45, FIG. 2, each have a rectangular cross-section. The width of these grooves 45 can be kept essentially similar for any installation and product changeover. The grooves widths need be sufficient to accommodate the size of the bands held therein.

However, for change parts, i.e., in the changeover of the gate assembly structure for a different product, there may be a need to change either the off-set 47 between adjacent grooves 45, or the distance 49 between the upper member 43a and lower 43b grooves 45, or change both distances 47, 49. This is accomplished either by changing the spacing between grooves 45. It is also accomplished by changing the depth of the grooves 45 or by changing the thickness of the gate members 43a, 43b or by doing both. The distance 49 between the bottom of the upper gate member 43a groove 45 and the bottom of the lower gate member 43b groove establishes the distance between the upper gating location and the lower gating location positions above-discussed. Normally, product size mandates this distance 49. However, product shape, surface characteristics and other factors can also affect the determination of this distance 49.

Figure 3:
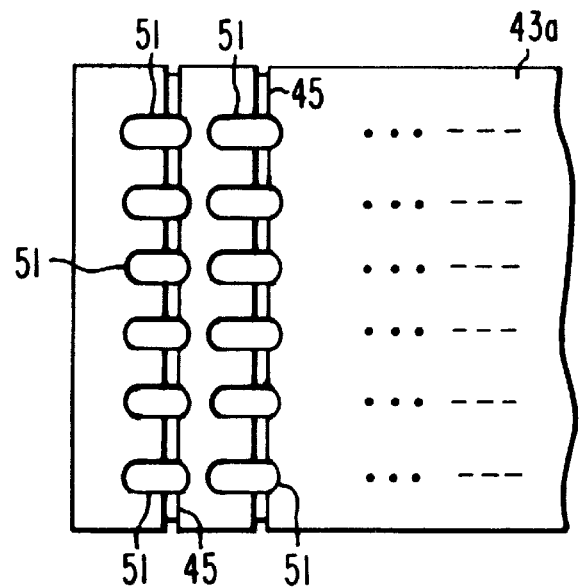
FIG. 3 is a plan view of the gate carrier plate of FIG. 2.

In its operation, the gate assembly 35, gate plate 43 interrupts the extensions of the plurality of passageways 31. The gate assembly 35 has a single gate plate 43 in operation at a time. This gate plate 43, with its upper member 43a and lower member 43b assembled together contains a series of rows of elongate holes or openings 51 therethrough, FIG. 3.

The passageways 31 are implemented with individual tubes 31, which will be described further below. The tubular passageways 31 extend through a respective one of the openings 51 when the gate assembly 35 is in operation. The size and spacing of these elongate holes 51, as well as their number, is determined by the product and pattern of product loaded onto the web 23.

The upper and lower gate members 43a, 43b are machined from materials accepted by the pharmaceutical industry for handling pharmaceutical product. Presently an aluminum, DELRIN plastic or ERTALYTE plastic material is used for the gate plate members 43a, 43b. These members can be pinned together to travel together.

Figure 4:
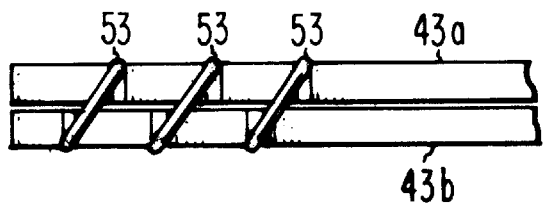
FIG. 4 is a partial side view of the gate carrier plate of FIG. 2, with a plurality of flexible bands installed thereon.
Figure 5:
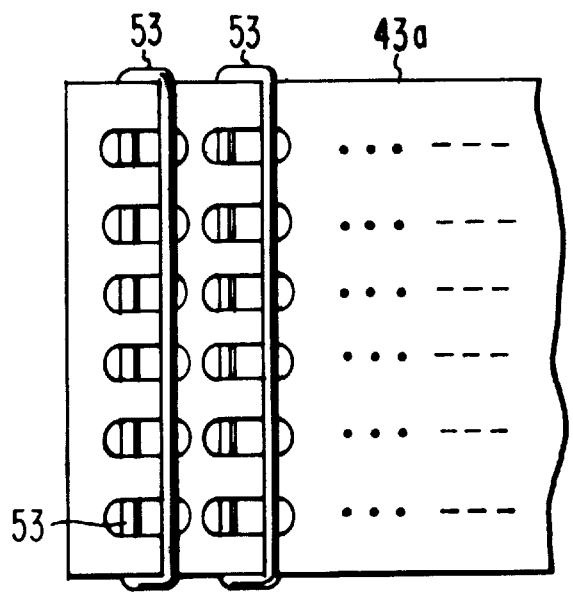
FIG. 5 is a plan view of the gate carrier plate and plurality of flexible bands of FIG. 4.

A series of O-ring shaped flexible bands 53 are positioned about the gate plate 43 upper and lower members 43a, 43b, with a single band extending about an off-set groove 45 pair, FIG. 4. The bands 53 are each pharmaceutical grade O-rings, such as "BUNA-N" type commercial bands. Their diameter (cross-section) and size is selected so that each band is stretched in a range of about 140 to 150 percent when installed in the grooves 45 of the gate plate 43, FIGS. 4 and 5. An alternative to this assembly is discussed below. In that alternative, the O-rings are transversely positioned to the orientation of FIG. 4, and extend in grooves in a single gate plate member.

In reference to FIG. 4, the section of each O-ring positioned in a groove 45 in the upper gate plate member 43a, operates as the upper position product holding and release structure. The section of each O-ring positioned in the off-set paired groove 45 in the lower gate plate member 43b, operates as the lower position product holding and release structure.

Figure 6:
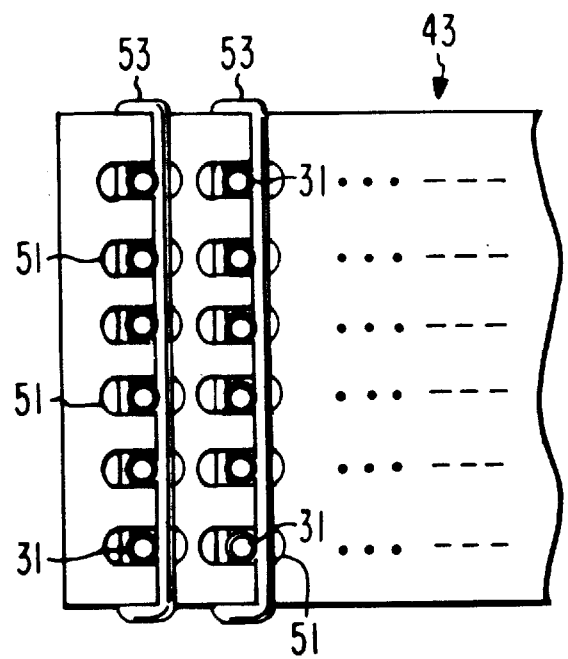
FIG. 6 is a plan view of the gate carrier plate and plurality of flexible bands of FIG. 5, with the carrier plate positioned to operate about a plurality of feed tubes into which the flexible bands operate.

The gate plate assembly 43 moves horizontally back and forth as shown in FIG. 6. Each tubular passageway 31 remains stationary and is simultaneously trans-sected by either the top section of a flexible band 53 or a bottom section of a flexible band. A single band 53 operates to gate an entire row of passageway tubes 31. The gate plate assembly 43 carries an assemblage of flexible bands 53, one for each row of passageway tubes 31. This assemblage of flexible bands 53 act simultaneously to gate an individual product unit from each passageway tube 31 to load the product matrix web pockets 33 (FIG. 1). In an alternative described below they can act separately.

Figures 7, 8, 8A:
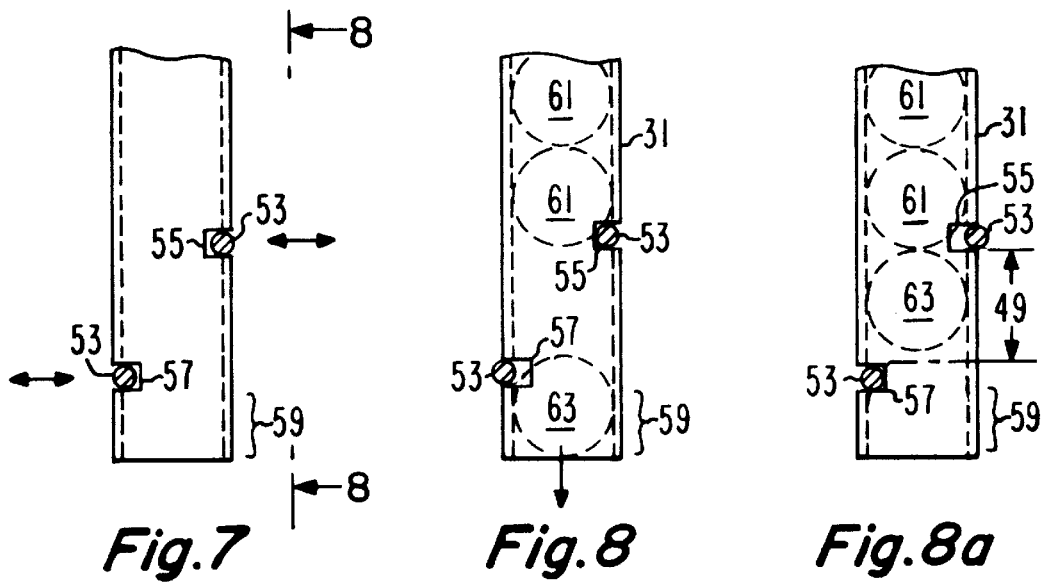
FIG. 7 is side view representation of an individual feed tube with the first and second flexible band in position to transversely co-act with said feed tube.
FIG. 8 is a longitudinal cross-section of the feed tube taken as seen in FIG. 7, showing the first and second flexible bands positioned to hold the sequential line of product, while releasing (discharging) the foremost end individual product unit from the discharge position of the feed tube.
FIG. 8a is a longitudinal cross-section of the feed tube of FIG. 7 showing the first and second flexible bands positioned to index an next-in-line individual product to the discharge position.

The operation of the flexible bands 53 with respect to the passageway tubes 31 and the pharmaceutical product is illustrated in FIGS. 7, 8 and 8a. Each passageway tube 31 has an upper guide slot 55 and a lower guide slot 57, FIG. 7. The band 53 sections operates by moving into and out of the slots 55 and 57, thereby trans-secting the flow path of product and either stopping or releasing product. A tube section 59 extends for a short distance below the lower slot 57. This tube section 59 assures that the gating operation of the band 53 does not cause the product path to change and aligns the product discharge with the web pockets 33 below (FIG. 1). The assemblage of these discharge tube sections 59 act as the alignment structure 37 of FIG. 1.

As understood from FIGS. 8, when the flexible band 53 section moves into the upper guide slot 53, it intercepts the product units 61 and their progress down the tube 31 is stopped at that upper gating location. Simultaneously the flexible band 53 section moves out of the lower guide slot 57 and releases the individual product 63 held at the lower gating location which passes onto the discharge end of the tube 31 as it passes through the alignment section 59 of the tube.

The flexible band 53 then moves to its other position where the band 53 section in the upper guide slot 53, FIG. 8a, moves out of the tube 31 allowing the line of product units 61 to move down the tube 31. Simultaneously, the band 53 section in the lower guide slot 57 moves into the slot 57 to intercept the product path and stop the product units with a single product unit 63 positioned at the lower gating location. This first in line, next-to-discharge product unit 63 is positioned in the distance 49 between the upper and lower gating locations. This distance 49 is established by product size, shape and orientation and is the indexing distance for single product indexing from each tube 31.

For pharmaceutical products available to be gated by the gate assembly, and for the package web sizes and patterns currently used, the O-rings 53 have a nominal size of 0.070 inches and when stretched onto the gate plate assembly 43, these O-rings 53 have a nominal size of 0.060 inches. The upper 43a and lower 43b gate plate member grooves 45 can nominally be 1/16 inches deep and nominally 1/16 inches wide. However this depth is varied to suite the product dimensions and characteristics. The upper guide slot 55 and lower guide slot 57 each extend transversely into the tube 31 walls to cut a curved cavity in the wall of the tube 31. The cross-sectional width of the upper 55 and lower 57 guide slots are nominally 0.100 inches. The depth of these guide slots can be from 1/16 to 1/2 inches deep, dependant upon the size and shape of the product 61 and the diameter of the tube 31. Sizing is product dependant and can be altered while remaining within the scope of the invention.

Figure 9:
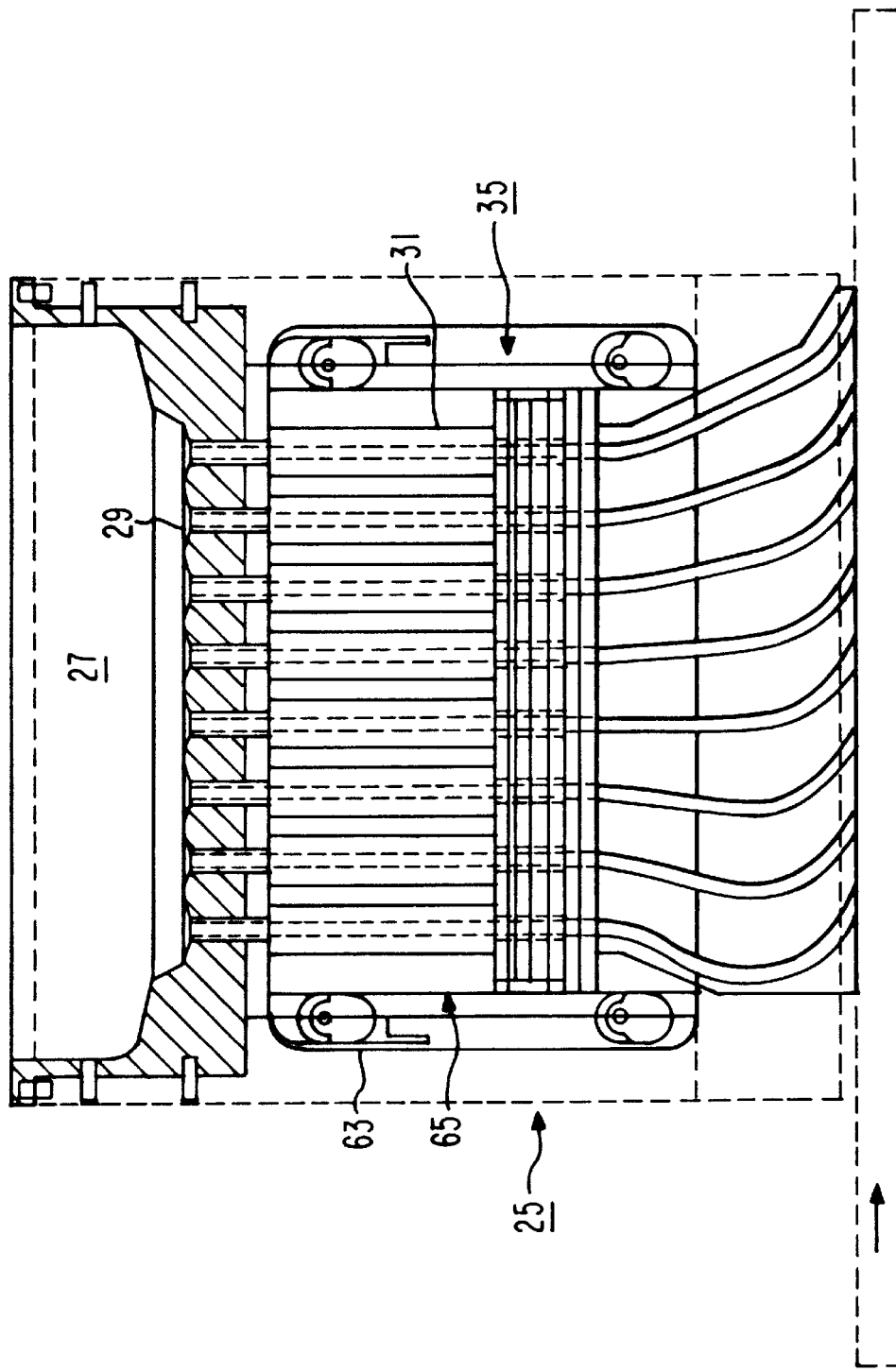
FIG. 9 is a machine drawing, in partial frontal cross section, for the flexible band gate assembly installation at the feeder station of a packaging system.

FIG. 9 shows a front cross-sectional view of a machine installation of the invention showing product passageway tubes 31 leading from a product distribution structure 29 which is located below a product bin 27. The product passageway tubes 31 lead to a gating assembly 35 of the upper 43a and lower 43b gate members and the plurality of flexible bands 53. This assembly 35 is positioned above the portion of the product web 23 to be filled with product. A cam drive 63 is connected to the gate assembly framework 65 and raises and lowers the gate assembly 35. This gate assembly frame work 65 also carries the product passageway tubes 31 with it so that they remain fixed vertically with respect to the gate assembly 35, whereby the entire structure moves up away from the product web 23 after a loading operation and down on the next web 23 portion as it moves into position at the loading station 25.

Figure 10:
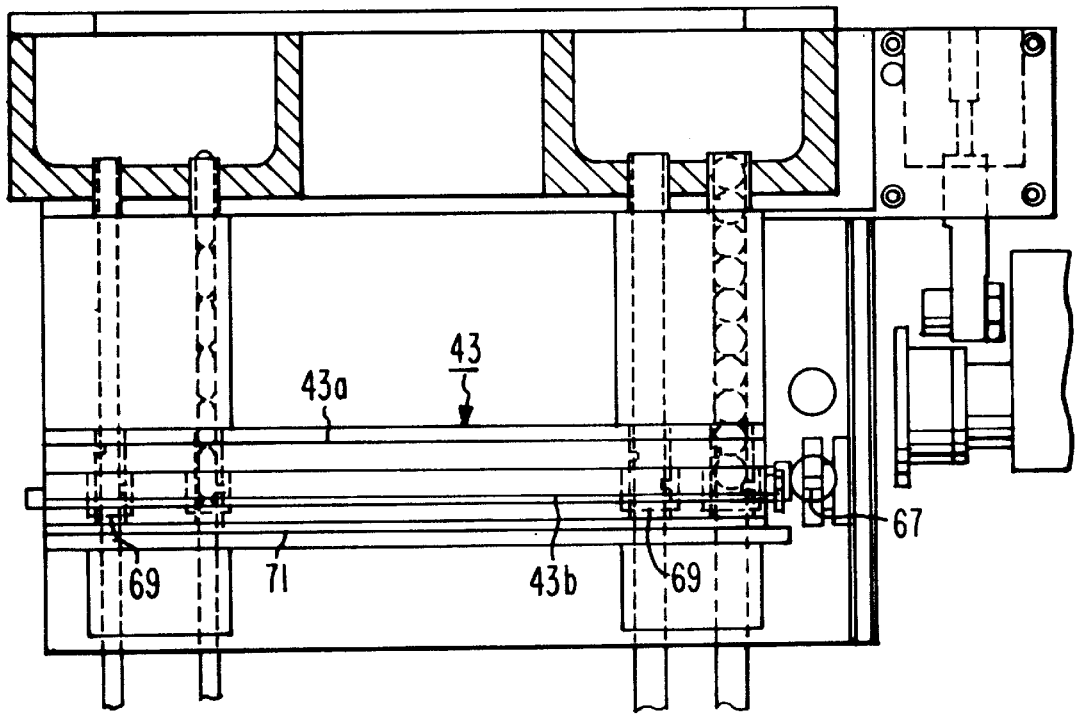
FIG. 10 is side or end cross sectional view of the feed tubes, flexible band gate assembly of FIG. 9.

The gate plate assembly 43, FIG. 10, is oscillated horizontally to perform the gating operation. Movement is obtained from a bi-directional air cylinder drive 67 connected to the gate plate assembly 43. The gate plate assembly 43 has a plurality of guides 69 which ride in guide slots 71 situated below the gate plate assembly 43. This guide system reduces any mechanical miss-alignment of the moving parts.

For certain products, as shown in the Figures in connection with the above description, the passageway tubes 31 are assembled from a stack of machined plates, FIGS. 11 and 11a. FIG. 11 shows a side view while FIG. 11a shows a top view. For this configuration, the plates of the stack are of two configurations, an intermediate plate 73 and an end plate 75. FIGS. 11c and 11e show a side view and a top view, respectively, of an intermediate plate 73. FIGS. 11d and 11f show a side view and a top view, respectively, of an end plate 75. Each of these plates has at least one abutment face, FIG. 11b, having half a passageway 31 cavity formed thereinto. A passageway tube 31 is formed by the abutment of two adjacent plates wherein the two halves of a passageway are joined. This configuration is a manufacturing choice. As an example, for absolutely round product, the plurality of passageway 31 could be formed by drilling out a hole pattern in a single block of material.

The upper gate plate member 43a for the structure shown in FIG. 10 is shown in top view in FIG. 12. A y-axis sectional of this member 43a is shown in FIG. 12a and in x-axis sectional is shown in FIG. 12b. The elongate holes 51 through the member 43a are shown in two different patterns, these being a large product pattern 77 and a small product pattern 79, consistent with the large and small products shown in FIG. 10.

The interfacing face of the upper gate plate member 43a abuts the lower gate plate member 43b and is held in position thereto, with a plurality of connection pins 81.

The lower gate plate member 43b, FIG. 13, also carries the product patterns 77 and 79 consistent with the product patterns 77 and 79 in the upper gate plate member 43a and with the product sizes shown in FIG. 10. A y-axis section, FIG. 13a, of the lower gate member 43b, shows the receiving slots 83 for the connection pins 83 and an air cylinder drive attachment 84. An x-section, FIG. 13b, of the lower gate plate member 43b, shows a cam plate pivot pin 85.

A cam plate 86, FIG. 14, is used to slide the upper and lower gate plate members 43a, 43b, from their normal position with respect to one another, thereby spreading the flexible bands 53. This cam plate has a finger tab for manually rotating it and a curved slot in which a cam pin 87 operates. The cam plate has a curved surface which rides against the edge of the upper guide plate member 43a.

A cam plate guide pin 87, shown in FIGS. 12a and 14, protrudes from the abutment face of the upper member 43a, FIG. 12a, and operates in the curved cam slot 89 of the cam plate 86, FIG. 14. The guides 69 are attached to the bottom face of the lower gate plate member 43b as shown in FIG. 13b.

The gate plate members 43a, 43b are secured together when the connection pins 81 are seated into their respective mating slots 83. The connection pins 81 each carry a snap ring 91 or other spring device which mates with a groove in the connection pin slots 83. The upper 43a and lower 43b members are free to move slightly with respect to one another so as to spread the longitudinal extension of the upper and lower band 55 sections at the tube 31 guide slots 55, 57. This spreading of a band 55 opens a passageway 31 and allows product to fall freely to clear a jam.

The present invention operates as a two step interrupting and indexing gating processor. It gates product through a straight flow path structure. The gate member which comes in contact with the product is a flexible band with a round cross section. The flexibility of this band reduces or eliminates the previous chipping and shearing of product. The permitted give of the flexible band, which is the product contact member, promotes hang-up reduction. Furthermore, the limited spreading of a flexible band, without the disassembly of the gate structure, permits the free movement of product for the clearing of the feeder gate structure, which, previously, was not possible without disassembly of the structure.

The configuration of the gate plates members 43a, 43b and the flexible bands 55, of FIG. 4, can be alternately configured as shown in FIG. 15. A top guide plate member 93a and a bottom guide plate 93b abut one another separated by spacers 95. A plurality of slots 97 are cut into the mating faces of the guide plate members 93a, 93b. Flexible bands 99 are positioned horizontally and ride with the respective face of the member.

The gate plate members 93a, 93b move into and out of the face of the figure. The bands 99 intercept product pathways or tubes 31, shown in phantom, and operate in the upper and lower guide slots 55, 57 in those tubes 31, as with the first configuration.

Two air cylinders 101, 103 can be used, one each to independently move a respective gate plate member 93a, 93b, FIG. 16, or the previous configuration guide plate members 43a, 43b. The upper and lower guide plate members 93a, 93b are then move separately, and the gating operation at the upper and the lower gate locations can be controlled in synchronism or out of synchronism. This individual control would eliminate the need for the cam 86 operation for jam clearing by flexible band 55 spreading.

Many changes can be made to the above-recited invention without departing from the intent and scope thereof. The present flexible band gating apparatus can easily operate with a product line where product is forced along the product pathway (such as with a horizontally fed product path) instead of the drop product pathway (gravity fed) described above. It is intended that the above description be interpreted as offered as illustrative of the invention and not be taken in the limiting sense.

What is claimed is:

1. A pharmaceutical product feeder gate assembly for indexing and gating product from at least one product passageway, by interrupting the product flow path in said passageway to alternately hold a line of product units in said passageway while releasing a single product unit at the discharge end of said passageway and then by indexing a next single product unit to the release position, comprising:

a plurality of guide slots extending into said product passageway, at least one guide slot being positioned at an upper location on said passageway, and a second guide slot positioned at a lower location on said passageway;

a first flexible interruption member being operable in said upper location guide slot to interrupt said passageway product path at said upper location, said first flexible interruption member being of longitudinally stretchable material;

a second flexible interruption member being operable in said lower location guide slot to interrupt said passageway product path at said lower location, said second flexible interruption member being of longitudinally stretchable material;

a carrier structure connected to said first and second flexible interruption members for controlling said flexible members movement with respect to their positions in said respective guide slot in which said member operates;

wherein each flexible member position in its respective guide slot is controlled by said carrier structure to interrupt said product path on an exclusive basis; and a drive connected to said carrier structure, said drive determining the speed, the travel and the synchronization of operation of said carrier structure.

2. The feeder gate assembly of claim 1, wherein said first and second flexible interruption members are each flexible bands.

3. The feeder gate assembly of claim 2, wherein said first and second interruption member flexible bands are both portions of a single o-ring flexible band.

4. The feeder gate assembly of claim 3, wherein said upper location guide slot is oriented on the opposite side of said product passageway path from the side on which said lower location guide slot is located.

5. The feeder gate assembly of claim 4, wherein said upper location guide slot is positioned and oriented diametrically opposed to said lower location guide slot.

6. The feeder gate assembly of claim 5, wherein said carrier structure carries said single flexible band mounted thereabout, with said first interruption member portion off-set from said second interruption member portion, said off-set distance permitting said exclusive basis product flow path interruption.

7. The feeder gate assembly of claim 6, wherein said carrier structure has a vertical extending elongate hole therethrough permitting said carrier structure to surround said passageway at said first and second guide slot locations.

8. The feeder gate assembly of claim 7, wherein said drive includes a movement apparatus to cause said carrier to oscillate horizontally about said passageway whereby said flexible band first and second interruption member portions carried thereon alternately interrupt said product flow path by alternately traveling into and out of the respective guide slot.

9. The feeder gate assembly of claim 8, wherein said carrier structure includes two horizontally operating plates, each with a vertically extending elongate passageway hole therethrough, said upper and lower plates being fixedly aligned with said elongate holes aligned.

10. The feeder gate assembly of claim 9, wherein said carrier structure upper and lower plates have said flexible band extending thereabout, with said first interruption member portion fixedly off-set from said second interruption member portion.

11. The feeder gate assembly of claim 10, wherein said carrier structure plates have guide members extending therefrom.

12. The feeder gate assembly of claim 11, also including a guide rail system in engagement with said carrier plate guide members for guiding the movement of said plates in a predetermined horizontal plane.

13. The feeder gate assembly of claim 12, wherein said drive receives signals and causes said carrier structure to move back and forth on said guide rail system in response to said signals.

14. The feeder gate assembly of claim 13, also including an alignment structure positioned below said lower location for receiving released product unit and aligning the movement of said released product unit with a target below.

15. The feeder gate assembly of claim 14, also including a support structure to which said passageway, said plate guide rail system and said drive movement apparatus are connected, and a vertical movement drive for raising said support structure after the release of a product unit, and for lowering said support structure prior to the release of a said next product unit.

16. The feeder gate assembly of claim 15, wherein said upper and lower carrier plates may be loosened while in position and moved with respect to one another, to spread said flexible band, thereby moving said first and second product path interruption member apart to clear a product jamb from said gate assembly.

17. A process for gating a plurality of pharmaceutical product units simultaneously, in a product matrix, to a package web, comprising the steps of:

establishing a plurality of product lines, one for each position in said product matrix;

interrupting the product travel at a first location in each product line, simultaneously, with a first flexible barrier;

flexing said first flexible barrier in a longitudinal manner from said pathway in each product line, simultaneously, for a period of time sufficient to allow a single product unit to pass the first location in each product line;

further interrupting the product travel pathway at a second location beyond the first location in each product line, simultaneously, with a second flexible barrier to stop a single product unit at said second location; and flexing said second flexible barrier in a longitudinal from said pathway at said second location of each product line, simultaneously, for a period of time sufficient to allow said single product unit stopped at said second location in each said pathway to simultaneously move to said package web.

18. The process of claim 17 wherein said first and second flexible barriers are moved concurrently in opposite directions with respect to said pathway of each product line.

19. A pharmaceutical product feeder gate assembly for gating a plurality of individual product units, simultaneously in a matrix format, from a plurality of product line pathways structured in said matrix format, comprising:

a first plurality of guides oriented with respect to said plurality of product line pathways, one guide per a single pathway, respectively, with said orientation being at a first location on each said pathway;

a second plurality of guides oriented with respect to said plurality of product line pathways, one guide per a single pathway, respectively, with said orientation being at a second location on each said pathway;

a plurality of flexible o-ring bands, one said flexible band for each row of said matrix of pathways, said flexible bands each having a first flexible portion operating in co-operation with said first guide to intercept a said product pathway at a said first location, and a second flexible portion operating in co-operation with said second guide to intercept a said product pathway at a said second location;

a carrier structure carrying and positioning each of said plurality of flexible bands wherein said band operation is simultaneous with each of said product pathways and synchronized to first index a product unit from said product line, and then to discharge said individual indexed product unit, said indexing and discharging being simultaneously conducted with each pathway of said matrix.

20. The pharmaceutical product feeder gate assembly of claim 19 wherein said plurality of flexible bands are each identical closed loop bands, and wherein said carrier structure is selectively adjustable in place to simultaneously spread each said band thereby changing the positioning of said band each said first and second portions with respect to each said product pathway, thereby creating a clear pathway flow through permitting jam clearing in situ.

* * * * *